2 Sheets--Sheet 1
SIMEON HOWES & G. E. THROOP.
Grain Separator and Scourer.
No. 4,793. Reissued March 5, 1872.
Fig. I.
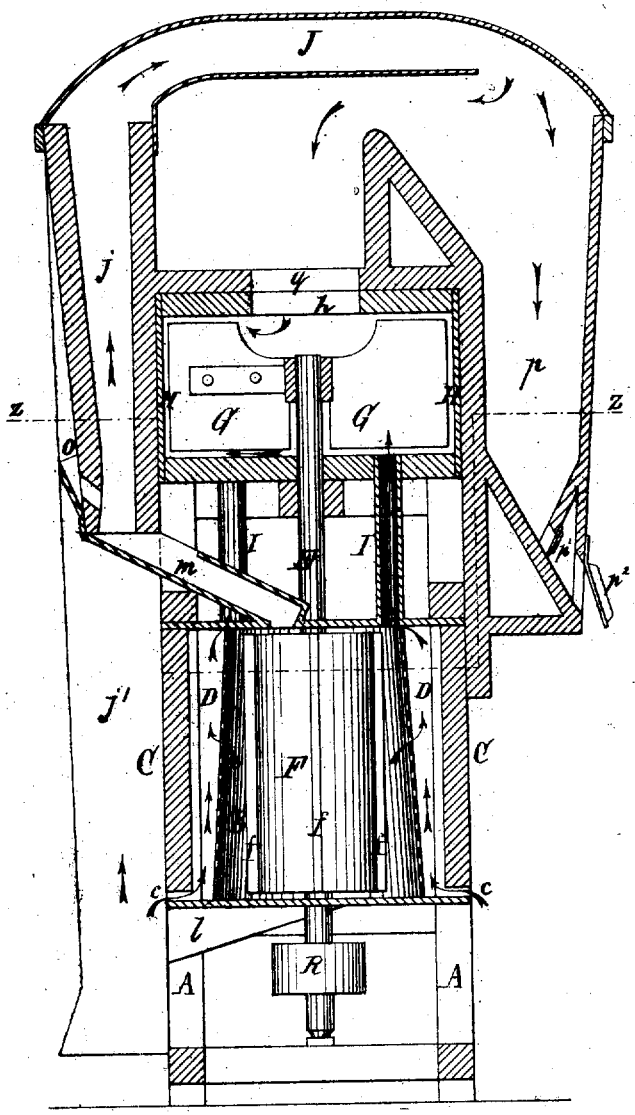
Fig. I.
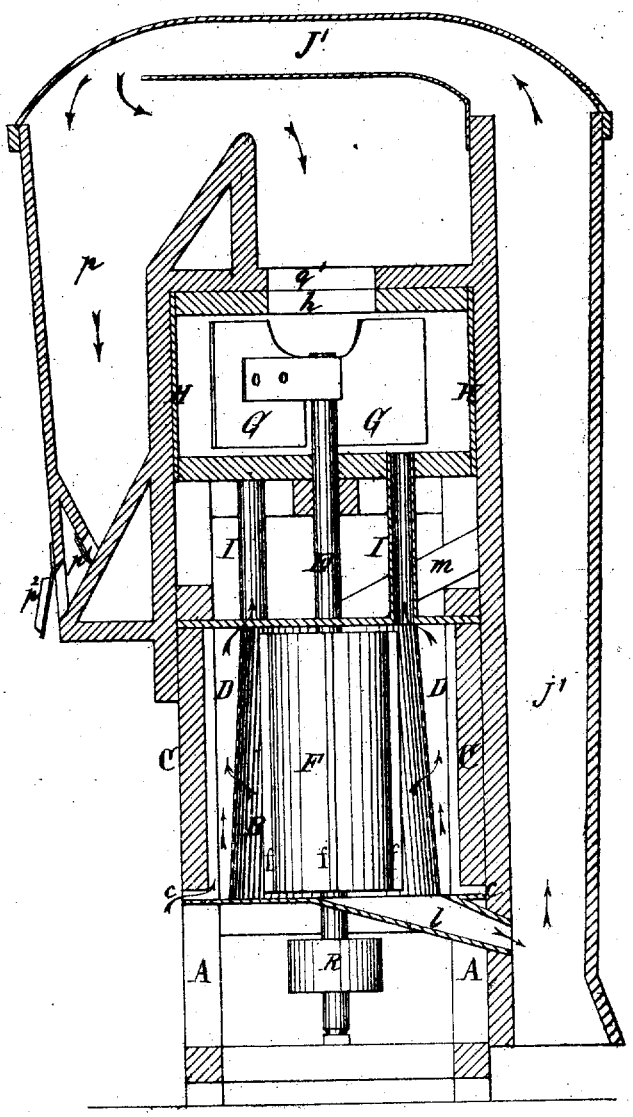
Edward Wilhelm
Jno. J. Bonner
Witnesses.
S. Howes.
G. E. Throop
A. Babcock
N. Babcock
C. Ewell
by Jay Hyatt Way 2 Sheets--Sheet 2
SIMEON HOWES & G. E. THROOP.
Grain Separator and Scourer.
No. 4,793. Reissued March 5, 1872.
Fig. III.
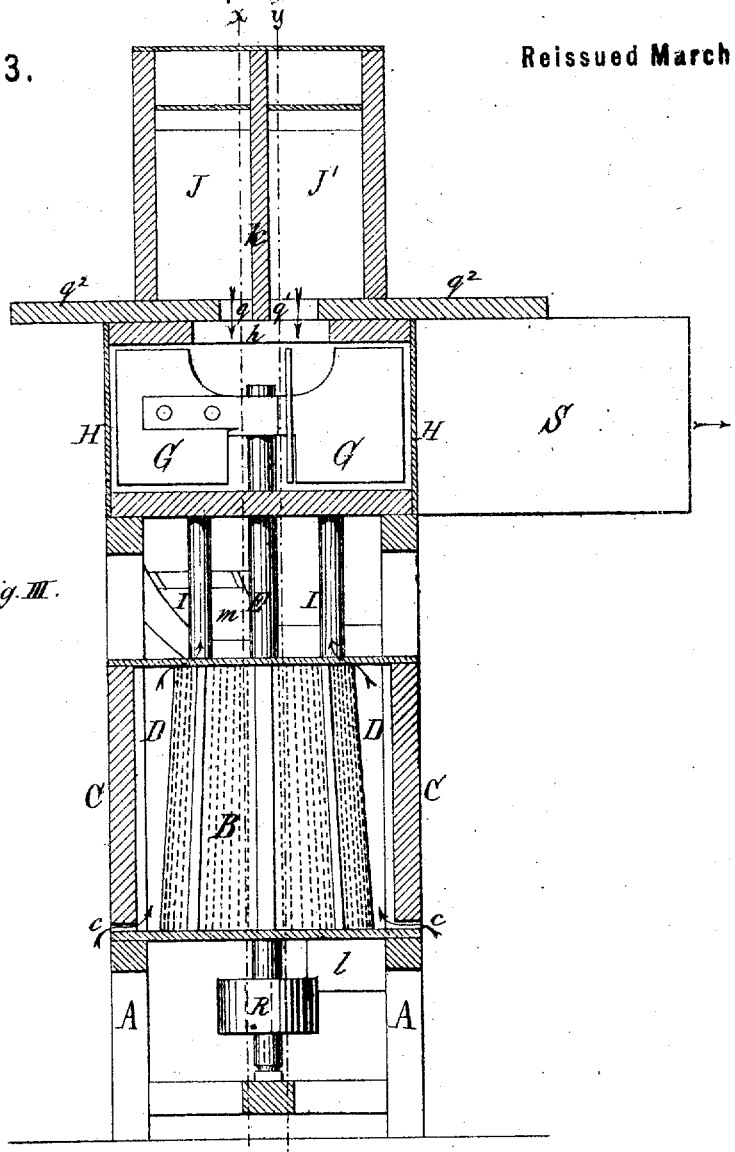
Fig. IV.
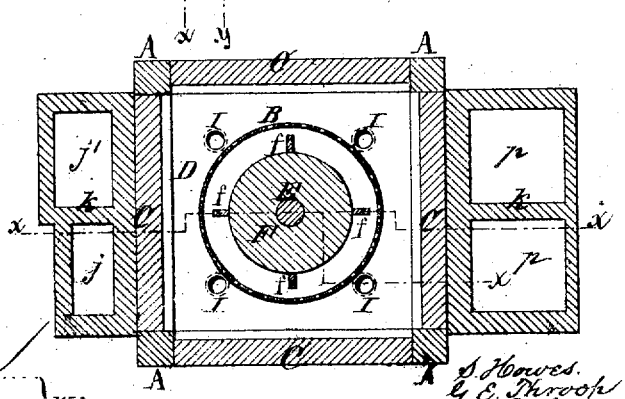
Edward Wilhelm
Jno. J. Bonner } Witnesses.
S. Howes.
G. E. Throop
A. Babcock
N. Babcock
E. Ewell by Jay Hyatt Atty.

UNITED STATES PATENT OFFICE.

SIMEON HOWES, OF SILVER CREEK, AND GARDNER E. THROOP, OF SYRACUSE, ASSIGNORS, BY MESNE ASSIGNMENTS, TO THEMSELVES, ALPHEUS BABCOCK, NORMAN BABCOCK, AND CARLOS EWELL, OF SILVER CREEK, NEW YORK.

IMPROVEMENT IN GRAIN SEPARATORS AND SCOURERS.

Specification forming part of Letters Patent No. 19,637, dated March 16, 1858; reissue No. 4,793, dated March 5, 1872.

SPECIFICATION.

*To all whom it may concern:*

Be it known that SIMEON HOWES, of Silver Creek, in the county of Chautauqua and State of New York, and GARDNER E. THROOP, of Syracuse, in the county of Onondaga and State of New York, (formerly of Chicago, Illinois,) did invent certain Improvements in Smut-Machines and Grain-Separators, of which the following is a specification:

*Nature and Objects of the Invention.*

The improvements relate to that class of combined machines which both scour the grain and also separate the heavy grain from the light grain and screenings, and the cheat and light grain from the dust, chaff, and other refuse. The object of the invention is to effect a more perfect cleaning and separation of smut and other refuse from the full grains and from the cheat and lighter grains than has heretofore been accomplished, and at the same time render the machine more compact, simple, and cheap in construction, and enable it to be more conveniently operated and regulated than other machines. The invention consists: First, in the combination, with a suction-fan, a perforated inclosing-shell or cylinder, and an outer tight casing, of a draught-passage leading directly from the inclosed space outside of the scouring-shell to the fan-case, and provided with auxiliary air-inlets, whereby the particles of smut and other impurities, as they are detached from the grain and drawn or forced through the perforations of the cylinder, will be removed and conducted directly to the fan. Second, in the combination, with a grain-scourer and suction-fan, of two separating wind-trunks, arranged side by side, one receiving the grain before it enters the scourer and effecting what is termed a preliminary separation, and the other receiving the grain as it is discharged from the scourer and effecting what is termed a subsequent separation, each wind-trunk effecting three separations in a similar manner: first, of the full or plump grain; second, of cheat and light or shrunken grain; and third, of the smut, dust, chaff, and other refuse, the products of the second separation from both wind-trunks being discharged near each other on the same side of the machine, while the products of the third separation (the refuse material) are conducted from both wind-trunks into the eye of the fan.

*General Description.*

In the accompanying drawing, Figure I is a vertical section through the preliminary separating wind-trunk, the plane of section being approximately represented by the broken dotted line *x x* in Figs. III and IV. Fig. II is a similar section through the subsequent separating wind-trunk, in line approximately represented by *y y* in Fig. III. Fig. III is a nearly central vertical cross-section, made at right angles to those of Figs. I and II. Fig. IV is a horizontal section looking upward in broken line *z z*, Fig. I.

Like letters of reference designate like parts in each of the figures.

A is the frame of the combined machine; B, the perforated smutting or scouring shell or cylinder; and C, the surrounding case, leaving a space, D, between the two, into which air is admitted through narrow auxiliary openings *c* at the bottom. E is the central vertical shaft, to which is secured, within the scouring shell or cylinder, a beater-cylinder, F, provided with radial wings or beaters *f*. G are the fan-blades, keyed to the upper end of the shaft; and H, the fan-case, with an opening or eye, *h*, in its top. I I are air pipes or passages, which connect the chamber D outside of the scouring-cylinder directly with the fan-case. J is the preliminary and J′ the subsequent separating wind-trunk, arranged side by side and separated by a partition, *k*. They are similar in construction, except that the ascending leg *j′* of the subsequent separator extends downward nearly to the floor, so as to permit the grain from the scouring-cylinder to be discharged through a spout, *l*, into it, as shown in Fig. II, while the ascending leg *j* of the preliminary separator terminates a little above the top of the scouring-cylinder, and is provided with a spout, *m*, through which the grain, fed into the leg by means of a spout or hopper, *o*, is conducted into the top of the scouring-cylinder. On the opposite side of the machine each of the wind-trunks are constructed with dependent chess-hoppers *p*, each provided with two flap-valves, $p^1$ $p^2$, which are are closed by atmospheric pressure, except when forced open by the weight of the accumulated grain therein. Both wind-trunks communicate with the eye of the fan through openings $q$ $q^1$, provided with slides $q^2$ for regulating the size of the passages and force of the air-currents.

*Operation.*

Motion being communicated to the shaft E by means of the driving-pulley R, exhaust currents of air through the wind-trunks, chamber D, and passages I leading to the fan, are induced in the direction indicated by the darts. The grain fed through the hopper *o* into the ascending leg of the wind-trunk J is met by the upward current of air therein, which arrests the smut-balls, chaff, dust, and most of the chess and lighter grains, and carries them upward with it over to the opposite side of the machine, to the enlarged mouth of the chess-hopper, into which the cheat and light grains descend by gravity (owing to the reversal of the air current and the weakened draught occasioned by the enlargement of the hopper) while the smut-balls, chaff, and other refuse, take the reversed direction of the air-current and are conducted through the opening *q* into the eye of the fan. The plump grain descends from the hopper *o*, through the spout *m*, into the scouring-cylinder, where it is subjected to the action of the beaters and the inner surface of the perforated cylinder, which rubs off and detaches from the kernels the smut and other adherent matter, which is forced and drawn by the centrifugal action induced by the beaters and by the suction in the space D, through the perforations of the scouring-cylinder, into the chamber D, and conducted thence through the passages I directly to the fan, without commingling with or again coming in contact with the scoured grain. This is of the greatest importance, as the pulverulent smut is of such a sticky and adhesive nature that if the kernels become besmeared with the same it becomes practically impossible to remove it by any subsequent operation of the machine; and especially is this the case in damp weather and when the grain is not thoroughly dry. The auxiliary inlets *c* supply the requisite amount of air to the space D to create, in connection with the fan, the necessary draught. The scoured grain passes from the scouring-cylinder, through the pipe or spout *l*, into the ascending leg of the spout J′, near its lower end, where it is again met by an ascending current, which removes the light grains, chaff, dust, &c., remaining therein, and separates and deposits the light grains on the opposite side of the machine in the same manner as the preliminary separation in the wind-trunk J was effected. The smut, dust, and other refuse are ejected from the fan-case into a trunk, S, by which it is conveyed out of the apartment or building, as required.

The combination broadly in a smut-machine and grain-separator of an air-passage connecting an inclosed space outside of a perforated scouring-cylinder with a fan is not claimed as new; neither is the combination of two wind-trunks for effecting a preliminary and a subsequent separation in such combined machine broadly claimed.

*Claims.*

1. The combination, with a suction-fan, scouring-mechanism, perforated inclosing-shell, and outer tight casing, of a draught-passage connecting the chamber outside of said perforated shell directly with the fan-case, said passage being provided with auxiliary air inlets or openings, substantially as and for the purpose set forth.

2. In a combined scourer and grain-separator, the arrangement of two wind-trunks side by side, in the manner shown and described, and for the purpose hereinbefore set forth.

GARDNER E. THROOP.
SIMEON HOWES.
ALPHEUS BABCOCK.
NORMAN BABCOCK.
C. EWELL.

Witnesses:
GEO. G. BARNUM,
CHAS. N. HOWES.